United States Patent
Chang et al.

(10) Patent No.: US 9,236,608 B2
(45) Date of Patent: *Jan. 12, 2016

(54) CATHODE ACTIVE MATERIAL FOR LITHIUM SECONDARY BATTERY

(71) Applicant: LG CHEM, LTD., Seoul (KR)

(72) Inventors: Sung Kyun Chang, Daejeon (KR); Hong-Kyu Park, Daejeon (KR); Ho Suk Shin, Seoul (KR); Seung Tae Hong, Daejeon (KR); Youngsun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 232 days.

This patent is subject to a terminal disclaimer.

(21) Appl. No.: 13/928,886

(22) Filed: Jun. 27, 2013

(65) Prior Publication Data

US 2013/0284972 A1 Oct. 31, 2013

Related U.S. Application Data

(63) Continuation of application No. 13/050,730, filed on Mar. 17, 2011, now Pat. No. 8,497,039, which is a continuation-in-part of application No. 12/565,033, filed on Sep. 23, 2009, now Pat. No. 7,935,444, which is a continuation of application No. PCT/KR2009/005149, filed on Sep. 10, 2009.

(30) Foreign Application Priority Data

Sep. 10, 2008 (KR) ........................ 10-2008-0089335

(51) Int. Cl.
*H01M 4/505* (2010.01)
*H01M 4/525* (2010.01)
*H01M 10/052* (2010.01)

(52) U.S. Cl.
CPC .............. *H01M 4/505* (2013.01); *H01M 4/525* (2013.01); *H01M 10/052* (2013.01); *Y02E 60/122* (2013.01)

(58) Field of Classification Search
CPC ... H01M 4/505; H01M 4/525; H01M 10/052; Y02E 60/122
USPC .................... 423/593.1, 594.4, 593.6, 599; 429/231.1, 231.95, 223, 224; 252/182.1
See application file for complete search history.

(56) References Cited

U.S. PATENT DOCUMENTS

| | | | |
|---|---|---|---|
| 6,660,432 B2 | 12/2003 | Paulsen et al. | |
| 6,964,828 B2 | 11/2005 | Lu et al. | |
| 7,078,128 B2 | 7/2006 | Lu et al. | |
| 7,135,252 B2 | 11/2006 | Thackeray et al. | |
| 7,314,682 B2 | 1/2008 | Thackeray et al. | |
| 7,393,476 B2 | 7/2008 | Shiozaki et al. | |
| 7,935,444 B2 * | 5/2011 | Chang et al. | 429/231.95 |
| 8,481,213 B2 * | 7/2013 | Chang et al. | 429/231.95 |
| 8,497,039 B2 * | 7/2013 | Chang et al. | 429/231.95 |
| 8,603,676 B2 * | 12/2013 | Choi et al. | 429/223 |
| 8,715,856 B2 * | 5/2014 | Choi et al. | 429/223 |
| 2005/0175897 A1 | 8/2005 | Jung et al. | |
| 2008/0160410 A1 | 7/2008 | Sun et al. | |
| 2008/0187825 A1 | 8/2008 | Kawabata et al. | |
| 2009/0011334 A1 | 1/2009 | Shizuka et al. | |
| 2010/0227222 A1 | 9/2010 | Chang et al. | |

FOREIGN PATENT DOCUMENTS

| | | |
|---|---|---|
| JP | 2001-083610 A | 3/2001 |
| JP | 2004-111076 A | 4/2004 |
| JP | 2008-47306 A | 2/2008 |
| KR | 10-2003-0034018 A | 5/2003 |
| KR | 10-2005-0047291 A | 5/2005 |
| KR | 10-2007-0082902 A | 8/2007 |
| WO | WO 2006/085467 A1 | 8/2006 |
| WO | WO 2008/086041 A1 | 7/2008 |

OTHER PUBLICATIONS

Hwang, B.J. et al, "Influence of Mn content on the morphology and electrochemical performance of LiNi1-x-yCoxMnyO2 cathode materials," J Master. Chem. 13 (2003), pp. 1962-1968.

Kobayashi, H. et al, "Changes in the structure and physical properties of the solid solution LiNi1-xMnxO2 with variation in its composition," J. Mater. Chem., 2003, vol. 13, pp. 590-595.

Yoshio, M. et al, "Preparation and properties of LiCoyMnxNi1-x-yO2 as a cathode for lithium ion batteries," Journal of Power Sciences, 2000, vol. 90, pp. 176-181.

Ngala et al., "The Synthesis, Characterization and Electrochemical Behavior of the Layered $LiNi_{0.4}Mn_{0.4}Co_{0.2}O_2$ Compound," Journal of Materials Chemistry, vol. 14, 2004, (published online Dec. 10, 2003), pp. 214-220.

\* cited by examiner

*Primary Examiner* — Anthony J Zimmer
(74) *Attorney, Agent, or Firm* — Birch, Stewart, Kolasch & Birch, LLP

(57) ABSTRACT

Provided is a cathode active material which is lithium transition metal oxide having an $\alpha$-$NaFeO_2$ layered crystal structure, wherein the transition metal is a blend of Ni and Mn, an average oxidation number of the transition metals except lithium is more than +3, and lithium transition metal oxide satisfies the Equation m(Ni)≥m(Mn) (in which m (Ni) and m (Mn) represent an molar number of nickel and manganese, respectively). The lithium transition metal oxide has a uniform and stable layered structure through control of oxidation number of transition metals to a level higher than +3, thus advantageously exerting improved overall electrochemical properties including electric capacity, in particular, superior high-rate charge/discharge characteristics.

22 Claims, No Drawings

CATHODE ACTIVE MATERIAL FOR LITHIUM SECONDARY BATTERY

This application is a Continuation of co-pending application Ser. No. 13/050,730, filed Mar. 17, 2011, which is a Continuation-In-Part of application Ser. No. 12/565,033 filed on Sep. 23, 2009, which issued as U.S. Pat. No. 7,935,444 on May 3, 2011. Application Ser. No. 12/565,033 is a Continuation of PCT International Application No. PCT/KR2009/005149 filed on Sep. 10, 2009, and which claims priority to Patent Application No. 10-2008-0089335, filed in the Republic of Korea on Sep. 10, 2008. The entire contents of all of the above applications are hereby incorporated by reference.

TECHNICAL FIELD

The present invention relates to a cathode active material for lithium secondary batteries. More specifically, the present invention relates to a cathode active material which is a lithium transition metal oxide having a layered crystal structure, wherein the transition metal is a blend of Ni and Mn, an average oxidation number of the transition metals except lithium is more than +3, and nickel content is comparable to or higher than manganese content, based on the molar ratio of transition metals. The lithium transition metal oxide has a stable layered structure with a uniform crystal shape through control of the oxidation number of transition metals, thus exerting superior rate characteristics under high-rate charge/discharge conditions as well as improved overall electrochemical properties.

BACKGROUND ART

Technological development and increased demand for mobile equipment have led to a rapid increase in the demand for secondary batteries as energy sources. Among these secondary batteries, lithium secondary batteries having high energy density and voltage, long cycle span and low self-discharge are commercially available and widely used.

In addition, increased interest in environmental issues has brought about a great deal of research associated with electric vehicles, hybrid electric vehicles and plug-in hybrid electric vehicles which alternate vehicles using fossil fuels such as gasoline vehicles and diesel vehicles. These electric vehicles generally use nickel-metal hydride secondary batteries as power sources. However, a great deal of study associated with use of lithium secondary batteries with high energy density and discharge voltage is currently underway and some of them are commercially available.

Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure and $LiMn_2O_4$ having a spinel crystal structure and lithium nickel composite oxide ($LiNiO_2$) as the cathode active material has been considered.

Among these cathode active materials, $LiCoO_2$ is the most generally used owing to superior physical properties such as long life span and good charge/discharge characteristics, but has low structural stability and is costly due to natural resource limitations of cobalt used as a raw material, thus disadvantageously having limited price competiveness.

Lithium manganese oxides such as $LiMnO_2$ and $LiMn_2O_4$ have advantages of superior thermal stability and low costs, but have disadvantages of low capacity and bad low-temperature characteristics.

In addition, $LiMnO_2$-based cathode active materials are relatively cheap and exhibit higher discharge characteristics, but are disadvantageously difficult to synthesize and are unstable.

In order to solve the afore-mentioned problems, the present invention provides a low-cost highly functional cathode active material comprising lithium transition metal composite oxide wherein constituent elements satisfy the requirements including predetermined composition and oxidation number conditions, as mentioned below.

In this regard, U.S. Pat. No. 6,964,828 discloses a lithium transition metal oxide having a structure of $Li(M1_{(1-x)}-Mn_x)O_2$ wherein M1 is a metal other than Cr, and each Ni has an oxidation number of +2, each Co has an oxidation number of +3, and each Mn has an oxidation number of +4, provided that M1 is Ni or Co.

In addition, Korean Patent Laid-open No. 2005-0047291 suggests a lithium transition metal oxide wherein Ni and Mn are present in equivalents amounts and have an oxidation number of +2 and +4, respectively.

As another example, Korean Patent No. 0543720 discloses a lithium transition metal oxide wherein Ni and Mn are present in substantially equivalent amounts, Ni has an oxidation number of 2.0 to 2.5 and Mn has an oxidation number of 3.5 to 4.0. This patent discloses that Ni and Mn should substantially have an oxidation number of +2 and +4, respectively, and that lithium batteries are deteriorated in properties, unless Ni and Mn have an oxidation number of +2 and +4, respectively, as apparent from Examples and Comparative Examples.

Also, Japanese Patent Application Publication No. 2001-0083610 discloses a lithium transition metal oxide which is represented by a structure of $Li((Li(Ni_{1/2}Mn_{1/2})_{(1-x)})O_2$ or $Li((Li_x(Ni_yMn_yCo_p)_{(1-x)})O_2$ and contains Ni and Mn in equivalent amounts. In accordance with the application, provided that Ni and Mn are present in identical amounts, Ni and Mn form $Ni^{2+}$ and $Mn^{4+}$, respectively, realizing structural stability and thus providing the desired layered structure.

Accordingly, in accordance with the prior art, the average oxidation number of transition metals should be +3, which is mentioned in U.S. Pat. No. 7,314,682. In this patent, the inventors disclose lithium transition metal oxide represented by the structure of $Li_{(2+2x)/(2+x)}M'_{2x(2+2x)/(2+x)}M_{(2-2x)/(2+x)}O_{2-\delta}$ wherein M' is an element having an average oxidation number of +3, in which M' is not Li, and M is a transition metal having an average oxidation number of +3.

As can be confirmed from the afore-mentioned related patents, it was conventionally believed that (i) transition metals should have an average oxidation number of +3 in order to impart a stable layered structure to lithium transition metal oxide, and (ii) Ni present in an amount equivalent to $Mn^{4+}$ should have an oxidation number of +2 in order to impart superior electrochemical properties to the lithium transition metal oxide, based on the premise (i).

However, the inventors of the present application confirmed that, in the case where $Mn^{4+}$ and $Ni^{2+}$ are simply selected to obtain an average oxidation number of +3, $Ni^{2+}$ or the like is transferred to reversible Li sites, the problem, deterioration in electrochemical properties, cannot be solved.

Meanwhile, U.S. Pat. Nos. 7,078,128 and 7,135,252 suggest materials wherein Mn is present in an amount higher than that of Ni. However, the inventors of the present invention confirmed that a high amount of Mn cannot change an oxidation number of $Mn^{4+}$ upon Li-charging and thus causes a decrease in capacity.

DISCLOSURE

Technical Problem

Therefore, the present invention has been made to solve the above problems and other technical problems that have yet to be resolved and it is one aspect of the present invention to provide a cathode active material with superior structural and electrochemical properties.

As a result of a variety of extensive and intensive studies and experiments to solve the problems as described above, the inventors of the present invention have discovered that in the case where a cathode active material based on a lithium transition metal oxide having a layered crystal structure wherein the transition metal has an average oxidation number higher than +3 and nickel is present in an amount equivalent to that of manganese, the cathode active material has a complete crystal structure, thus considerably improving high-rate charge/discharge characteristics. The present invention was completed based on this discovery.

Technical Solution

Accordingly, the cathode active material for lithium secondary batteries is a lithium transition metal oxide which has a layered crystal structure, wherein the transition metal is a blend of Ni and Mn, and an average oxidation number of the transition metals except lithium is more than +3, and satisfies Equation 1 below:

$$m(Ni) \geq m(Mn) \quad (1)$$

wherein m (Ni) and m (Mn) represent a molar number of manganese and nickel, respectively.

In a preferred embodiment, the layered crystal structure is an $\alpha$-NaFeO$_2$ layered crystal structure.

As mentioned above, it was known in the art that presence of $Ni^{2+}$ and $Mn^{4+}$ in equivalent amounts makes an average oxidation number of transition metal ions +3, thereby obtaining a desired layered structure. However, since $Ni^{2+}$ has a size substantially similar to $Li^+$, it moves to the lithium layer and readily forms a sodium salt, thus disadvantageously causing deterioration in electrochemical properties.

Accordingly, the inventors of the present invention conducted a great deal of research to prepare a cathode active material which has a stable layered crystal structure and exhibits superior capacity and rate characteristics. As a result, the inventors discovered that the stable layered crystal structure depends on the size difference between the lithium ion and the transition metal ion, rather than $Ni^{2+}$ and $Mn^{4+}$.

Specifically, the inventors confirmed that lithium composite transition metal oxide having a layered crystal structure of $\alpha$-NaFeO$_2$ is divided into a lithium-containing Li-oxide layer (referred to as a "lithium layer") and a transition metal-containing transition metal oxide layer (referred to as an "MO layer"). As the size difference between the ions constituting respective layers, that is, the lithium and transition metal ions, increases, the two layers can be readily separated and developed.

The inventors of the present invention thoroughly tried to accomplish the desired layered crystal structure. As a result, the inventors confirmed that the size difference between the ions is expressed by the bonding distance between each ion and the oxygen ion or bonding force therebetween, and as a metal having cationic characteristics has an increased oxidation number, it has a decreased ionic diameter. In addition, the inventors considered that the difference between the MO layer and the lithium layer can be increased by increasing the oxidation number of transition metals. This expectation was confirmed through a great deal of experiments.

The principle that the layered crystal structure can be suitably developed through increased size difference between the lithium ion and the transition metal ion by increasing the average oxidation number of transition metal to a level higher than +3 is in contrast to the conventional idea accepted in the art that the average oxidation number of transition metals should be adjusted to +3 to stabilize the layered crystal structure.

The inventors of the present invention predicted that the best method to increase the oxidation number of transition metals would be to adjust the total average oxidation number to more than +3 by decreasing the amount of $Ni^{2+}$, which can be readily permeated into the lithium layer. This prediction is based on the idea that the amount of $Ni^{3+}$ having a size smaller than $Ni^{2+}$ increases, thus causing an increase in size difference between the ions.

Meanwhile, the cathode active material according to the present invention, as mentioned above, contains nickel and manganese wherein nickel is present in an amount equivalent to or higher than manganese. When the content of manganese is higher than that of nickel, capacity is disadvantageously decreased. On the other hand, the cathode active material of the present invention solves this problem.

In a preferred embodiment, the cathode active material of the present invention may optionally comprise, in addition to nickel and manganese, cobalt.

In this case, regarding the composition of transition metals present in the cathode active material, for example, based on the molar ratio of the transition metals, the nickel content is 0.3 to 0.9, and the manganese content is 0.1 to 0.5 under the condition of Equation 1, and the cobalt content is 0.0 to 0.4. The composition of transition metals which can realize superior properties when practically applied to batteries is only provided for illustration and the improvement in properties is not limited to the composition.

Hereinafter, the present invention will be described in detail.

The cathode active material according to the present invention is lithium transition metal oxide wherein (i) the average oxidation number of transition metals except lithium is higher than +3 and (ii) nickel is present in an amount equivalent to or higher than manganese.

Advantageously, such lithium transition metal oxide can considerably decrease the amount of transition metals present in the lithium layer, based on the stable crystal structure of the cathode active material by maintaining the average oxidation number of transition metals to a level higher than +3, thus improving mobility and rate characteristics of lithium ions, as well as capacity.

Regarding the aspect (i), the cathode active material of the present invention has an average oxidation number of transition metals except lithium, higher than +3, thus decreasing an average size of transition metal ions, increasing the size difference between lithium ions, and promoting separation between layers, thereby forming a stable layered crystal structure.

When the average oxidation number of transition metals is excessively increased, electric charges capable of moving lithium ions are decreased, thus disadvantageously decreasing capacity. Preferably, the average oxidation number of transition metals is higher than 3.0 and not higher than 3.5, more preferably, 3.01 to 3.3, more particularly preferably, 3.1 to 3.3.

In this case, the total average oxidation number of Mn and Ni corresponding thereto is 3.0 to 3.5, preferably, 3.1 to 3.3.

"The average oxidation number of transition metals other than lithium" means, for example, that an average oxidation number of lithium ions may be negligible even when a part of lithium ions is present in a transition metal site.

Such an average oxidation number of each transition metal may be adjusted by, for example, varying a ratio of a transition metal to a transition metal precursor and an amount of a lithium precursor reacted during production of lithium transition metal oxide.

Regarding the aspect (ii), the cathode active material according to the present invention is composed of nickel and manganese wherein the content of nickel is equivalent to or higher than that of manganese, on a molar basis, as represented by Equation 1 below:

$$m(Ni) \geq m(Mn) \qquad (1)$$

When nickel is present in an amount higher than manganese, nickel in an amount corresponding to the difference between the nickel content and the manganese content, is changed to $Ni^{3+}$, thus decreasing ion size. Accordingly, the average size difference between the lithium ion and the transition metal ion increases, thus minimizing permeation of $Ni^{2+}$ into the lithium layer, and improving stability of the layered crystal structure.

On the other hand, when manganese is present in an amount higher than nickel, +4 ions which do not contribute to charging/discharging are increased and capacity is thus decreased.

As mentioned above, in the case where the cathode active material according to the present invention contains excessive nickel, as compared to manganese, the nickel is divided into nickel (a) present in an excessive amount, as compared to the manganese content and nickel (b) present in an amount corresponding to the manganese content.

Preferably, the nickel (a) is $Ni^{3+}$, and the nickel (b) contains $Ni^{2+}$ and $Ni^{3+}$.

As such, for the cathode active material according to the present invention, the nickel content is equivalent to or higher than the manganese content, an average oxidation number of transition metals is higher than +3, the size difference between the lithium ion and the transition metal ion increases, layer separation is promoted and permeation of $Ni^{2+}$ into the lithium layer can be minimized. For the cathode active material, the content of nickel inserted into the lithium site may be lower than 5 mol %.

Preferably, the cathode active material contains $Ni^{2+}$ and $Mn^{4+}$ wherein $Ni^{2+}$ is present in an amount smaller than $Mn^{4+}$ Specifically, as represented by Equation 2 below, a molar ratio of $Mn^{4+}$ to $Ni^{2+}$, i.e., $m(Ni^{2+})/m(Mn^{4+})$, is 0.4 to 1. That is, the content of $Ni^{2+}$ is not equivalent to the content of $Mn^{4+}$, and the content of $Ni^{2+}$ is smaller than that of $Mn^{4+}$.

$$0.4 < m(Ni^{2+})/m(Mn^{4+}) < 1 \qquad (2)$$

When the $m(Ni^{2+})/m(Mn^{4+})$ is 1 or higher, an increase in average oxidation number of transition metals is not obtained and thus size difference between the ions cannot be induced. When $m(Ni^{2+})/m(Mn^{4+})$ is less than 0.4, an oxidation number of transition metals is excessively increased, and the amount of electric charges to be moved is decreased and capacity is thus decreased. When $m(Ni^{2+})/m(Mn^{4+})$ is 0.4 to 0.9, more superior electrochemical properties can be obtained.

For the lithium transition metal oxide of the present invention, transition metals comprising nickel, manganese and optionally cobalt can be partially substituted with other metal element(s), preferably the transition metals can be substituted in a small amount not higher than 5% by metals or cationic elements, so long as the layered crystal structure can be maintained. It is apparent that this case is included within the scope so long as it satisfies the properties of the present invention.

In addition to the lithium transition metal oxide according to the present invention, the cathode active material may comprise general lithium transition metal oxide which does not satisfy the conditions. The general lithium transition metal oxide includes all oxides composed of one or more of Ni, Co and Mn, for example, lithium transition metal oxides known in the art. Such a composite-type cathode active material comprises lithium transition metal oxide according to the present invention in an amount of at least 30 wt %, preferably at least 50 wt %.

The present invention provides a positive electrode comprising the cathode active material and a lithium secondary battery comprising the positive electrode. Hereinafter, the positive electrode is simply referred to as a "cathode".

The lithium secondary battery generally comprises a cathode, an anode, a separator, and a lithium salt-containing non-aqueous electrolyte.

For example, the cathode is prepared by applying a cathode mix comprising a cathode active material, a conductive material, a binder and a filler to a cathode current collector, followed by drying. The cathode mix may comprise a filler, if necessary.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium, silver or the like. If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

The conductive material is commonly added in an amount of 1 to 20% by weight, based on the total weight of the mixture including the cathode active material. Any conductive material may be used without particular limitation so long as it has suitable conductivity without causing adverse chemical changes in the fabricated secondary battery. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which enhances binding of an active material to a conductive material and current collector. The binder is commonly added in an amount of 1 to 20% by weight, based on the total weight of the compound including the anode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubber, fluoro rubber and various copolymers.

The filler is a component used to inhibit expansion of the cathode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

For example, the anode is prepared by applying an anode active material to an anode current collector, followed by drying. The anode active material may further comprise the afore-mentioned ingredients, i.e., the conductive material, the binder and the filler.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, these current collectors may also be processed to form fine irregularities on the surface thereof so as to enhance adhesion to the anode active materials. In addition, the current collectors may be used in various forms including films, sheets, foils, nets, porous structures, foams and non-woven fabrics.

In addition, examples of anode active materials that can be used in the present invention include carbons such as hard carbons and graphite carbons; metal composite oxides such as $Li_xFe_2O_3$ ($0 \leq y \leq 1$), $Li_yWO_2$ ($0 \leq y \leq 1$), $Sn_xMe_{1-x}Me'_yO_z$ (Me: Mn, Fe, Pb, Ge; Me': Al, B, P, Si, Group I, II and III elements of the Periodic Table, halogens; $0 < x \leq 1$; $1 \leq y \leq 3$; $1 \leq z \leq 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$ and the like; conductive polymers such as polyacetylene; and Li—Co—Ni materials.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The lithium secondary batteries may be used as unit batteries of battery modules which are power sources of medium-large devices requiring long cycles and high-rate charge/discharge characteristics.

Preferably, examples of medium-large devices include, but are not limited thereto, power tools driven by battery-powered motors; electric vehicles (EVs) including hybrid electric vehicles (HEVs) and plug-in hybrid electric vehicles (PHEVs); electric two-wheeled vehicles including E-bikes and E-scooters; and electric golf carts.

Accordingly, the present invention provides a medium-large battery pack including the lithium secondary batteries as units. The general structure and fabrication method of medium-large battery packs are known in the art and a detailed explanation thereof is thus omitted.

Advantageous Effects

As apparent from the fore-going, the present invention provides a cathode active material which is based on lithium transition metal oxide having a layered crystal structure, wherein the transition metal is a blend of Ni and Mn, an average oxidation number of transition metals except lithium is more than +3, and nickel content is comparable to or higher than manganese content, thus realizing a stable crystal structure and considerably superior high-rate charge/discharge characteristics.

BEST MODE

Now, the present invention will be described in more detail with reference to the following Examples. These examples are provided only for illustrating the present invention and should not be construed as limiting the scope and spirit of the present invention.

Example 1

A transition metal mixture comprising a nickel salt and a manganese salt wherein a molar ratio of Ni/Mn is 1.24 and a cobalt salt is contained in an amount of 8 mol % relative to a total amount of mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at the same temperature for 10 hours so as to produce a lithium transition metal composite oxide.

Example 2

A lithium transition metal composite oxide was prepared according to the same procedure as described in Example 1, except that the molar ratio of $Ni^{2+}/Mn^{4+}$ was 0.64.

Example 3

A lithium transition metal composite oxide was prepared according to the same procedure as described in Example 1, except that the molar ratio of $Ni^{2+}/Mn^{4+}$ was 0.52.

Example 4

A lithium transition metal composite oxide was prepared according to the same procedure as described in Example 1, except that the molar ratio of $Ni^{2+}/Mn^{4+}$ was 0.41.

Example 5

A lithium transition metal composite oxide was prepared according to the same procedure as described in Example 1, except that the molar ratio of $Ni^{2+}/Mn^{4+}$ was 0.88.

Comparative Example 1

A lithium transition metal composite oxide was prepared according to the same procedure as described in Example 1, except that the molar ratio of $Ni^{2+}/Mn^{4+}$ was 1.

Comparative Example 2

A lithium transition metal composite oxide was prepared according to the same procedure as described in Example 1, except that the molar ratio of $Ni^{2+}/Mn^{4+}$ was 0.29.

Example 6

A transition metal mixture comprising a nickel salt and a manganese salt wherein a molar ratio of Ni/Mn is 1.24 and a cobalt salt is contained with an amount of 8 mol % to a total amount of mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at 960° C. for 10 hours so as to produce a lithium transition metal composite oxide.

Example 7

A lithium transition metal composite oxide was prepared according to the same procedure as described in Example 6, except that the molar ratio of $Ni^{2+}/Mn^{4+}$ was 0.64.

Example 8

A lithium transition metal composite oxide was prepared according to the same procedure as described in Example 6, except that the molar ratio of $Ni^{2+}/Mn^{4+}$ was 0.52.

Example 9

A lithium transition metal composite oxide was prepared according to the same procedure as described in Example 6, except that the molar ratio of $Ni^{2+}/Mn^{4+}$ was 0.41.

Example 10

A lithium transition metal composite oxide was prepared according to the same procedure as described in Example 6, except that the molar ratio of $Ni^{2+}/Mn^{4+}$ was 0.88.

Comparative Example 3

A lithium transition metal composite oxide was prepared according to the same procedure as described in Example 6, except that the molar ratio of $Ni^{2+}/Mn^{4+}$ was 1.

Comparative Example 4

A lithium transition metal composite oxide was prepared according to the same procedure as described in Example 6, except that the molar ratio of $Ni^{2+}/Mn^{4+}$ was 0.29.

Example 11

A transition metal mixture comprising a nickel salt and a manganese salt wherein a molar ratio of Ni/Mn is 1.24 and a cobalt salt is contained in an amount of 8 mol % relative to a total amount of the mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at 970° C. for 10 hours so as to produce a lithium transition metal composite oxide.

Example 12

A lithium transition metal composite oxide was prepared according to the same procedure as described in Example 11, except that the molar ratio of $Ni^{2+}/Mn^{4+}$ was 0.64.

Example 13

A lithium transition metal composite oxide was prepared according to the same procedure as described in Example 11, except that the molar ratio of $Ni^{2+}/Mn^{4+}$ was 0.52.

Example 14

A lithium transition metal composite oxide was prepared according to the same procedure as described in Example 11, except that the molar ratio of $Ni^{2+}/Mn^{4+}$ was 0.41.

Example 15

A lithium transition metal composite oxide was prepared according to the same procedure as described in Example 11, except that the molar ratio of $Ni^{2+}/Mn^{4+}$ was 0.88.

Comparative Example 5

A lithium transition metal composite oxide was prepared according to the same procedure as described in Example 11, except that the molar ratio of $Ni^{2+}/Mn^{4+}$ was 1.

Comparative Example 6

A lithium transition metal composite oxide was prepared according to the same procedure as described in Example 11, except that the molar ratio of $Ni^{2+}/Mn^{4+}$ was 0.29.

Example 16

A transition metal mixture comprising a nickel salt and a manganese salt wherein a molar ratio of Ni/Mn is 1.24 and a cobalt salt is contained in an amount of 8 mol % relative to a total amount of mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at 980° C. for 10 hours so as to produce a lithium transition metal composite oxide.

Example 17

A lithium transition metal composite oxide was prepared according to the same procedure as described in Example 16, except that the molar ratio of $Ni^{2+}/Mn^{4+}$ was 0.64.

Example 18

A lithium transition metal composite oxide was prepared according to the same procedure as described in Example 16, except that the molar ratio of $Ni^{2+}/Mn^{4+}$ was 0.52.

Example 19

A lithium transition metal composite oxide was prepared according to the same procedure as described in Example 16, except that the molar ratio of $Ni^{2+}/Mn^{4+}$ was 0.41.

Example 20

A lithium transition metal composite oxide was prepared according to the same procedure as described in Example 16, except that the molar ratio of $Ni^{2+}/Mn^{4+}$ was 0.88.

Comparative Example 7

A lithium transition metal composite oxide was prepared according to the same procedure as described in Example 16, except that the molar ratio of $Ni^{2+}/Mn^{4+}$ was 1.

Comparative Example 8

A lithium transition metal composite oxide was prepared according to the same procedure as described in Example 16, except that the molar ratio of $Ni^{2+}/Mn^{4+}$ was 0.29.

Example 21

A transition metal mixture comprising a nickel salt and a manganese salt wherein a molar ratio of Ni/Mn is 1.24 and a cobalt salt is contained in an amount of 8 mol % relative to a total amount of the mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at 990° C. for 10 hours so as to produce a lithium transition metal composite oxide.

Example 22

A lithium transition metal composite oxide was prepared according to the same procedure as described in Example 21, except that the molar ratio of $Ni^{2+}/Mn^{4+}$ was 0.64.

Example 23

A lithium transition metal composite oxide was prepared according to the same procedure as described in Example 21, except that the molar ratio of $Ni^{2+}/Mn^{4+}$ was 0.52.

Example 24

A lithium transition metal composite oxide was prepared according to the same procedure as described in Example 21, except that the molar ratio of $Ni^{2+}/Mn^{4+}$ was 0.41.

Example 25

A lithium transition metal composite oxide was prepared according to the same procedure as described in Example 21, except that the molar ratio of $Ni^{2+}/Mn^{4+}$ was 0.88.

Comparative Example 9

A lithium transition metal composite oxide was prepared according to the same procedure as described in Example 21, except that the molar ratio of $Ni^{2+}/Mn^{4+}$ was 1.

Comparative Example 10

A lithium transition metal composite oxide was prepared according to the same procedure as described in Example 21, except that the molar ratio of $Ni^{2+}/Mn^{4+}$ was 0.29.

Example 26

A transition metal mixture comprising a nickel salt and a manganese salt wherein a molar ratio of Ni/Mn is 1.24 and a cobalt salt is contained in an amount of 8 mol % relative to a total amount of the mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 1000° C. at 300° C. per hour, the mixture was subjected to calcination at 1000° C. for 10 hours so as to produce a lithium transition metal composite oxide.

Example 27

A lithium transition metal composite oxide was prepared according to the same procedure as described in Example 26, except that the molar ratio of $Ni^{2+}/Mn^{4+}$ was 0.64.

Example 28

A lithium transition metal composite oxide was prepared according to the same procedure as described in Example 26, except that the molar ratio of $Ni^{2+}/Mn^{4+}$ was 0.52.

Example 29

A lithium transition metal composite oxide was prepared according to the same procedure as described in Example 26, except that the molar ratio of $Ni^{2+}/Mn^{4+}$ was 0.41.

Example 30

A lithium transition metal composite oxide was prepared according to the same procedure as described in Example 26, except that the molar ratio of $Ni^{2+}/Mn^{4+}$ was 0.88.

Example 31

A lithium transition metal composite oxide was prepared according to the same procedure as described in Example 1, except that the molar ratio of nickel salt to manganese salt (Ni/Mn) was 1.13.

Example 32

A lithium transition metal composite oxide was prepared according to the same procedure as described in Example 1, except that the molar ratio of Ni/Mn was 1.43.

Comparative Example 11

A lithium transition metal composite oxide was prepared according to the same procedure as described in Example 26, except that the molar ratio of $Ni^{2+}/Mn^{4+}$ was 1.

Comparative Example 12

A lithium transition metal composite oxide was prepared according to the same procedure as described in Example 26, except that the molar ratio of $Ni^{2+}/Mn^{4+}$ was 0.29.

Example 33

A lithium transition metal composite oxide was prepared according to the same procedure as described in Example 1, except that the molar ratio of Ni/Mn was 1, the cobalt salt was not added, and the calcination temperature was 1000° C.

Comparative Example 13

A lithium transition metal composite oxide was prepared according to the same procedure as described in Example 33, except that the molar ratio of $Ni^{2+}/Mn^{4+}$ was 1.

Comparative Example 14

A lithium transition metal composite oxide was prepared according to the same procedure as described in Example 33, except that the molar ratio of Ni/Mn was 0.96.

Comparative Example 15

A lithium transition metal composite oxide was prepared according to the same procedure as described in Example 33, except that the molar ratio of Ni/Mn was 0.90.

Comparative Example 16

A lithium transition metal composite oxide was prepared according to the same procedure as described in Example 33, except that the molar ratio of Ni/Mn was 0.82.

Experimental Example 1

As a cathode active material, each of the composite oxides prepared according to Examples 1 to 30, 33 and Comparative Examples 1 to 16 was added and uniformly mixed with NMP such that a ratio by weight (wt. %) of active material:conductive material:binder was 95:2.5:2.5. The mixture was applied to an aluminum foil with a thickness of 20 μm, followed by drying the coated foil at 130° C. to form a cathode. Roll-pressing the formed cathode to have a porosity of about 25%, the treated cathode was subjected to a blanking process to fabricate a cathode in the form of a coin with an area of 1.487 $cm^2$. As an opposite electrode of the fabricated coin type cathode, Li-metal was used. Using an electrolyte comprising 1M $LiPF_6$ in a solvent with a ratio of EC:DMC:DEC=1:2:1, a coin type cell was produced.

Through 0.1 C charge and 0.1 C discharge, a first cycle discharge capacity was obtained to the coin type cell fabricated above. A ratio of 1 C or 2 C discharge capacity relative to 0.1 C discharge capacity was represented by %, followed by measurement of rate capability for the cell. The results are shown in the following Table 1.

TABLE 1

| | 1st cycle discharge capacity (mAh/g) | 1st cycle efficiency (%) | 1C discharge/0.1C discharge (%) | 2C discharge/0.1C discharge (%) |
|---|---|---|---|---|
| Example 1 | 161.5 | 89.8 | 90.2 | 86.1 |
| Example 2 | 162.3 | 90.3 | 91.2 | 86.4 |
| Example 3 | 158.1 | 90.6 | 91.4 | 86.8 |
| Example 4 | 154.6 | 91.2 | 92.3 | 87.2 |
| Example 5 | 162.1 | 86.9 | 85.1 | 80.3 |
| Comparative example 1 | 150.3 | 83.5 | 76.2 | 65.7 |
| Comparative example 2 | 132.8 | 90.2 | 91.6 | 86.8 |
| Example 6 | 160.2 | 89.0 | 89.6 | 85.5 |
| Example 7 | 161.3 | 89.3 | 90.2 | 86.8 |
| Example 8 | 157.5 | 89.5 | 91.4 | 86.4 |
| Example 9 | 152.6 | 90.6 | 92.1 | 86.9 |
| Example 10 | 159.1 | 85.3 | 86.1 | 78.2 |
| Comparative example 3 | 148.2 | 84.5 | 73.2 | 65.9 |
| Comparative example 4 | 130.5 | 91.2 | 91.8 | 87.2 |
| Example 11 | 160.7 | 89.3 | 90.1 | 84.5 |
| Example 12 | 162.1 | 89.8 | 89.7 | 85.9 |
| Example 13 | 158.3 | 90.5 | 90.5 | 84.3 |
| Example 14 | 154.6 | 90.3 | 91.1 | 86.9 |
| Example 15 | 160.1 | 87.3 | 86.1 | 80.2 |
| Comparative example 5 | 149.9 | 83.8 | 72.2 | 65.2 |
| Comparative example 6 | 128.1 | 89.8 | 90.8 | 86.5 |
| Example 16 | 158.6 | 86.5 | 88.5 | 83.3 |
| Example 17 | 159.3 | 87.2 | 88.2 | 83.0 |
| Example 18 | 157.3 | 86.9 | 89.0 | 83.8 |
| Example 19 | 155.6 | 87.3 | 88.4 | 82.9 |
| Example 20 | 156.1 | 85.5 | 85.1 | 78.2 |
| Comparative example 7 | 143.6 | 81.3 | 69.3 | 62.5 |
| Comparative example 8 | 123.4 | 86.4 | 88.2 | 83.4 |
| Example 21 | 157.2 | 85.5 | 86.9 | 82.1 |
| Example 22 | 157.6 | 85.6 | 86.2 | 82.6 |
| Example 23 | 155.3 | 86.0 | 86.9 | 83.0 |
| Example 24 | 153.6 | 86.2 | 87.8 | 82.4 |
| Example 25 | 155.3 | 84.5 | 84.2 | 75.5 |
| Comparative example 9 | 141.5 | 81.3 | 65.3 | 60.5 |
| Comparative example 10 | 121.6 | 85.7 | 87.3 | 83.5 |
| Example 26 | 154.8 | 83.0 | 84.8 | 79.1 |
| Example 27 | 154.2 | 83.9 | 85.2 | 80.6 |
| Example 28 | 150.3 | 84.2 | 85.3 | 80.7 |
| Example 29 | 148.2 | 84.9 | 86.8 | 81.4 |
| Example 30 | 153.2 | 82.8 | 84.2 | 72.5 |
| Comparative example 11 | 138.2 | 81.3 | 60.3 | 52.2 |
| Comparative example 12 | 118.6 | 84.7 | 85.9 | 81.7 |
| Example 33 | 144.8 | 87.5 | 82.2 | 68.3 |
| Comparative example 13 | 130.2 | 84.3 | 70.1 | 53.6 |
| Comparative example 14 | 140.3 | 87.7 | 81.3 | 68.7 |
| Comparative example 15 | 132.9 | 86.9 | 81.6 | 67.4 |
| Comparative example 16 | 131.2 | 85.2 | 80.5 | 67.5 |

As listed in the above Table 1, all lithium secondary cells comprising the cathode active materials prepared in Examples of the present invention exhibited the first cycle discharge capacity of above 144 mAh/g as well as the first cycle efficiency of at least 82%. Moreover, all lithium second cells comprising the cathode active materials prepared in Examples of the present invention had a ratio of 2 C discharge capacity/0.1 C discharge capacity of at least 68%.

Experimental Example 2

As a cathode active material, each of the composite oxides prepared according to Examples 1 to 30 and Comparative Examples 1 to 12 was subjected to structural analysis through Retveld-refinement after XRD measurement. In addition, a ratio of Ni($Ni^{2+}$) introduced into the Li site and a ratio of $Ni^{3+}$ content in nickel(b) to Mn content were calculated and results thereof are shown in the following Table 2.

TABLE 2

| | $M(Ni^{2+})/m(Mn^{4+})$ | | Average oxidation number of transition metal | $Ni^{3+}$ among Ni(b), (%) | Average oxidation number of Mn and Ni (b) | Ratio of Ni(Ni) introduced into Li site (%) |
|---|---|---|---|---|---|---|
| | Calculated value | Measured value | | | | |
| Example 1 | 0.76 | 0.73 | 3.11 | 23.1 | 3.12 | 3.07 |
| Example 2 | 0.64 | 0.60 | 3.16 | 35.2 | 3.18 | 2.25 |
| Example 3 | 0.52 | 0.48 | 3.21 | 47.5 | 3.24 | 2.01 |
| Example 4 | 0.41 | 0.40 | 3.25 | 59.1 | 3.30 | 1.55 |
| Example 5 | 0.88 | 0.86 | 3.05 | 11.4 | 3.06 | 4.22 |
| Comparative example 1 | 1 | 1 | 3.00 | 0 | 3.00 | 5.33 |
| Comparative example 2 | 0.29 | 0.25 | 3.29 | 69.4 | 3.35 | 1.2 |
| Example 6 | 0.76 | 0.72 | 3.12 | 23.3 | 3.12 | 3.02 |
| Example 7 | 0.64 | 0.59 | 3.17 | 35.4 | 3.18 | 2.17 |
| Example 8 | 0.52 | 0.48 | 3.2 | 47.6 | 3.24 | 2.06 |
| Example 9 | 0.41 | 0.41 | 3.26 | 59.3 | 3.30 | 1.43 |
| Example 10 | 0.88 | 0.88 | 3.04 | 11.4 | 3.06 | 4.15 |
| Comparative example 3 | 1 | 1 | 3 | 0 | 3 | 5.29 |
| Comparative example 4 | 0.29 | 0.24 | 3.25 | 68.6 | 3.32 | 1.23 |
| Example 11 | 0.76 | 0.74 | 3.15 | 23.5 | 3.15 | 3.1 |
| Example 12 | 0.64 | 0.59 | 3.17 | 35.4 | 3.18 | 2.3 |
| Example 13 | 0.52 | 0.49 | 3.24 | 48.2 | 3.28 | 1.92 |
| Example 14 | 0.41 | 0.42 | 3.28 | 59.7 | 3.32 | 1.57 |
| Example 15 | 0.88 | 0.86 | 3.03 | 11.4 | 3.05 | 4.28 |
| Comparative example 5 | 1 | 1 | 3 | 0 | 3.00 | 5.68 |
| Comparative example 6 | 0.29 | 0.22 | 3.22 | 67.3 | 3.26 | 1.4 |
| Example 16 | 0.76 | 0.75 | 3.16 | 23.6 | 3.16 | 2.98 |
| Example 17 | 0.64 | 0.6 | 3.17 | 35.4 | 3.18 | 2.33 |
| Example 18 | 0.52 | 0.48 | 3.22 | 47.9 | 3.26 | 1.85 |
| Example 19 | 0.41 | 0.41 | 3.27 | 59.5 | 3.31 | 1.46 |
| Example 20 | 0.88 | 0.88 | 3.08 | 11.6 | 3.10 | 4.10 |
| Comparative example 7 | 1 | 1 | 3 | 0.0 | 3.00 | 5.22 |
| Comparative example 8 | 0.29 | 0.27 | 3.38 | 71.1 | 3.42 | 1.12 |
| Example 21 | 0.76 | 0.76 | 3.19 | 23.8 | 3.19 | 3.17 |
| Example 22 | 0.64 | 0.61 | 3.18 | 35.5 | 3.19 | 2.28 |
| Example 23 | 0.52 | 0.50 | 3.26 | 48.5 | 3.30 | 1.88 |
| Example 24 | 0.41 | 0.42 | 3.3 | 60.0 | 3.34 | 1.36 |
| Example 25 | 0.88 | 0.87 | 3.07 | 11.6 | 3.09 | 4.12 |
| Comparative example 9 | 1 | 1 | 3 | 0.0 | 3.00 | 5.12 |
| Comparative example 10 | 0.29 | 0.29 | 3.41 | 71.7 | 3.45 | 1.08 |
| Example 26 | 0.76 | 0.73 | 3.11 | 23.2 | 3.11 | 3.21 |
| Example 27 | 0.64 | 0.59 | 3.17 | 35.4 | 3.18 | 1.77 |
| Example 28 | 0.52 | 0.49 | 3.21 | 47.8 | 3.25 | 1.53 |
| Example 29 | 0.41 | 0.41 | 3.27 | 59.5 | 3.31 | 1.29 |

TABLE 2-continued

|  | M(Ni$^{2+}$)/m(Mn$^{4+}$) | | Average oxidation number of transition metal | Ni$^{3+}$ among Ni(b), (%) | Average oxidation number of Mn and Ni (b) | Ratio of Ni(Ni) introduced into Li site (%) |
|---|---|---|---|---|---|---|
|  | Calculated value | Measured value |  |  |  |  |
| Example 30 | 0.88 | 0.87 | 3.07 | 11.6 | 3.09 | 4.32 |
| Example 31 | 0.76 | 0.72 | 3.12 | 24.6 | 3.12 | 2.71 |
| Example 32 | 0.76 | 0.80 | 3.10 | 23.1 | 3.08 | 2.83 |
| Comparative example 11 | 1 | 1 | 3 | 0.0 | 3.00 | 5.80 |
| Comparative example 12 | 0.29 | 0.25 | 3.29 | 69.2 | 3.33 | 1.10 |

From the above Table 2, the ratio (%) of Ni(Ni$^{2+}$) introduced into the Li site means a ratio of Ni(Ni$^{2+}$) site to a total Li site, that is, a share rate of Ni(Ni$^{2+}$).

Further, the major reason that the measured value of m(Ni$^{2+}$)/m(Mn$^{4+}$) is lower than the calculated value of the same is based on partial evaporation of Li and measurement errors caused by a measuring apparatus.

As can be seen from Tables 1 and 2 above, the cathode active materials according to the present invention exhibit a slight decrease in capacity due to a decrease in specific surface area as a function of temperature, but the layered crystal structure can be more stably formed by increasing the average oxidation number of transition metals to a level higher than 3+, regardless of variations in temperature, or elevating the oxidation number of Ni present in an amount equivalent to that of manganese. Also, it can be seen that electrochemical properties such as rate properties and one-cycle charge/discharge efficiency consistently increase, based on the definite principle regardless of conditions such as temperature.

This means that cathode active material of the present invention increases the oxidation number of the transition metal layer, thereby increasing the size difference between the lithium ion and the transition metal ion and thus improving structural stability and electrochemical properties. In addition, it can be seen that as compared to a conventional case wherein Ni is added in an amount equivalent to that of Mn, each Ni is Ni$^{2+}$, the oxidation number of transition metals is +3 (See Comparative Examples 1, 3, 5, 7, 8 and 11), the present invention wherein the oxidation number of transition metal is adjusted to a level higher than +3 can efficiently stabilize the layered crystal structure.

In particular, even in the case where, for nickel (b) present in content comparable to the manganese content, Ni$^{3+}$ is present in an amount of 50% of higher, the present invention exhibits superior electrochemical properties, as compared to Comparative Examples.

Meanwhile, Example 33 exhibits the better results than Comparative Examples 13 to 16 in view of electrochemical properties such as rate properties and one-cycle charge/discharge efficiency although Mn is present in an amount comparable to Ni in the composition of Example 33. That is because the layered crystal structure can be more stably formed by increasing the average oxidation number of transition metals to a level higher than 3+, i.e., elevating the oxidation number of Ni present in an amount equivalent to that of manganese.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for a lithium secondary cell, comprising a lithium transition metal oxide with a layered crystalline structure in which the transition metal comprises a transition metal mixture of Ni, Mn and Co, an average oxidation number of all transition metals other than lithium is more than +3, and specific conditions represented by the following Formulae (1) and (2) are satisfied:

$$1.1 < m(\text{Ni})/m(\text{Mn}) < 1.5 \quad (1)$$

$$0.4 < m(\text{Ni}^{2+})/m(\text{Mn}^{4+}) < 1 \quad (2)$$

wherein m(Ni)/m(Mn) is a molar ratio of nickel to manganese and m(Ni$^{2+}$)/m(Mn$^{4+}$) is a molar ratio of Ni$^{2+}$ to Mn$^{4+}$.

2. The active material according to claim 1, wherein the layered crystalline structure is α-NaFeO$_2$ laminate crystalline structure.

3. The active material according to claim 1, wherein m(Ni)/m(Mn) is defined by 1.2≤m(Ni)/m(Mn)≤1.4.

4. The active material according to claim 1, wherein the average oxidation number of all transition metals other than lithium is more than 3.0 to not more than 3.5.

5. The active material according to claim 4, wherein the average oxidation number of all transition metals other than lithium ranges from 3.01 to 3.3.

6. The active material according to claim 4, wherein the average oxidation number of all transition metals other than lithium ranges from 3.1 to 3.3.

7. The active material according to claim 1, wherein the nickel portion comprises nickel (a) in an excess content relative to a content of manganese, as well as nickel (b) with a content corresponding to the content of manganese.

8. The active material according to claim 1, wherein the nickel portion has an average oxidation number of more than +2.

9. The active material according to claim 7, wherein the nickel (a) in the excess content relative to the content of manganese is Ni$^{3+}$.

10. The active material according to claim 7, wherein an overall average oxidation number of the nickel (b) with a content corresponding to the content of manganese is more than 3.0 to not more than 3.5.

11. The active material according to claim 10, wherein the overall average oxidation number of the nickel (b) with the content corresponding to the content of manganese ranges from 3.1 to 3.3.

12. The active material according to claim 7, wherein the nickel (b) with the content corresponding to the content of manganese comprises Ni$^{2+}$ and Ni$^{3+}$.

13. The active material according to claim 7, wherein Ni$^{3+}$ content ranges from 11 to 60% to the nickel (b) with the content corresponding to the content of manganese.

14. The active material according to claim 1, wherein a molar ratio of Ni$^{2+}$ to Mn$^{4+}$ is defined by 0.4<m(Ni$^{2+}$)/m(Mn$^{4+}$)≤0.9.

15. The active material according to claim 1, wherein an average oxidation number of manganese and nickel ranges from 3.05 to 3.35.

16. The active material according to claim 1, wherein a content of Co is less than 10 mol % relative to a total amount of transition metals.

17. The active material according to claim 1, wherein a ratio of Ni(Ni$^{2+}$) site is less than 5 mol % of a total Li site.

18. A cathode comprising the cathode active material as set forth in claim 1.

19. A lithium secondary cell having the cathode as set forth in claim 18.

20. The lithium secondary cell according to claim 19, wherein a first cycle discharge capacity is at least 148 mAh/g and a first cycle efficiency is at least 82%.

21. The lithium secondary cell according to claim 19, wherein a ratio of 2 C discharge capacity to 0.1 C discharge capacity is at least 72%.

22. A vehicle including the lithium secondary cell as set forth in claim 19.

\* \* \* \* \*